US012608575B1

(12) United States Patent
Yu et al.

(10) Patent No.: US 12,608,575 B1
(45) Date of Patent: Apr. 21, 2026

(54) ADAPTIVE QUICK RESPONSE CODE GENERATION AND DISPLAY METHOD

(71) Applicant: GM GLOBAL TECHNOLOGY OPERATIONS LLC, Detroit, MI (US)

(72) Inventors: Bo Yu, Troy, MI (US); Jinzhu Chen, Troy, MI (US); Chuan Li, Troy, MI (US); Brittany L. Pletscher, Oakland, MI (US); Ravikiran Dhullipala Chenchu, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 6 days.

(21) Appl. No.: 18/975,220

(22) Filed: Dec. 10, 2024

(51) Int. Cl.
| | |
|---|---|
| *G06K 19/06* | (2006.01) |
| *G06K 7/10* | (2006.01) |
| *G06Q 20/32* | (2012.01) |

(52) U.S. Cl.
CPC ...... *G06K 19/06112* (2013.01); *G06K 7/1095* (2013.01); *G06K 19/06037* (2013.01); *G06Q 20/3276* (2013.01)

(58) Field of Classification Search
CPC .......................... G06K 19/06112; G07B 15/00
See application file for complete search history.

(56) References Cited

U.S. PATENT DOCUMENTS

| | | | |
|---|---|---|---|
| 6,371,371 B1 * | 4/2002 | Reichenbach | G06K 7/10851 235/462.01 |
| 10,657,343 B1 * | 5/2020 | Studnicka | G06Q 20/40 |

| | | | |
|---|---|---|---|
| 11,667,474 B1 | 6/2023 | Ferdosali et al. | |
| 2011/0150346 A1 | 6/2011 | Panetta | |

(Continued)

FOREIGN PATENT DOCUMENTS

| | | |
|---|---|---|
| DE | 102017128294 A1 | 6/2018 |
| DE | 102019003903 A1 | 1/2020 |

(Continued)

OTHER PUBLICATIONS

"Choi et al., Real-time moving automotive vehicle identification system (AVIS), Aug. 6, 2002, IEEE Xplore, entire document" (Year: 2002).*

(Continued)

*Primary Examiner* — Abhishek Vyas
*Assistant Examiner* — Adam Hilmantel
(74) *Attorney, Agent, or Firm* — Quinn IP Law

(57) ABSTRACT

A method for dynamically generating a customized quick response (QR) code for scanning by a moving vehicle during a vehicle-merchant transaction includes detecting parameters of the vehicle-mounted camera, via a sensor suite of an infrastructure node in communication with a merchant back office, as the moving vehicle approaches the infrastructure node. The parameters include a distance and approach angle of the camera relative to the infrastructure node. The method also includes dynamically reshaping a baseline QR code in response to the parameters, via a processor of the infrastructure node, to thereby generate a customized QR code having a modified shape, size, and/or data capacity relative to the baseline QR code. The customized QR code is then displayed on the display screen as the moving vehicle approaches the infrastructure node to enable the camera to scan the customized QR code during the transaction.

20 Claims, 6 Drawing Sheets

(56) References Cited

U.S. PATENT DOCUMENTS

| | | |
|---|---|---|
| 2012/0091204 A1 | 4/2012 | Shi |
| 2015/0095123 A1* | 4/2015 | Wenninger ............. G07B 15/04 |
| | | 705/13 |
| 2019/0131695 A1 | 5/2019 | Thiruvarankan et al. |
| 2019/0251847 A1 | 8/2019 | Wu |
| 2019/0294844 A1 | 9/2019 | Burkhart et al. |
| 2019/0325379 A1 | 10/2019 | Medina et al. |
| 2020/0082452 A1 | 3/2020 | Malaprade et al. |
| 2020/0096349 A1 | 3/2020 | Black et al. |
| 2021/0033697 A1 | 2/2021 | Vyunova et al. |
| 2021/0065272 A1 | 3/2021 | Phillips et al. |
| 2021/0125370 A1 | 4/2021 | Wang et al. |
| 2021/0133410 A1 | 5/2021 | Wang et al. |
| 2021/0157998 A1* | 5/2021 | Rodriguez ............. G06V 20/20 |
| 2022/0036586 A1 | 2/2022 | Landron et al. |
| 2022/0116673 A1 | 4/2022 | Cho et al. |
| 2022/0164557 A1 | 5/2022 | Rossetto et al. |
| 2023/0036188 A1 | 2/2023 | Schmidt et al. |
| 2023/0222907 A1 | 7/2023 | Clifford |
| 2024/0030052 A1 | 1/2024 | Yoon et al. |
| 2024/0113496 A1 | 4/2024 | Blasczak et al. |
| 2024/0143804 A1 | 5/2024 | Mitschker et al. |
| 2025/0054345 A1 | 2/2025 | Sharma et al. |
| 2025/0182651 A1 | 6/2025 | Handshaw et al. |

FOREIGN PATENT DOCUMENTS

| | | | |
|---|---|---|---|
| DE | 202014011407 | 4/2020 | |
| DE | 102022111552 A1 | 11/2022 | |
| WO | WO-2023142379 A1 * | 8/2023 | ............. G07B 15/02 |

OTHER PUBLICATIONS

Hogpracha, Vongpeadhip; "Recognition system for QR code on moving car"; The 10th International Conference on Computer Science & Education (ICCSE 2015); Jul. 22-24, 2015. Fitzwilliam College, Cambridge University, UK.

* cited by examiner

B202

Collect historical data

B204

Calculate data capacity and resolution QR code

B206

Train SVM model

B208

Real-time classification

Crowd Sourcing $$li\ (X_i,\ X_j) = (X_i \cdot X_j + 1)^d$$

ADAPTIVE QUICK RESPONSE CODE GENERATION AND DISPLAY METHOD

INTRODUCTION

The present disclosure relates to automated systems and methods for aiding two-dimensional bar code e.g., quick response (QR CODE)®, scanning in a vehicle using one or more onboard cameras. As appreciated by those skilled in the art, QR codes are two-dimensional barcodes that store information, for instance a web site address, plain text, contact information, and the like. The information is converted into binary data and thereafter encoded into a pixilated black and white pattern. In a typical QR code, three large squares are disposed in the QR code's corners to enable the QR code to be identified and oriented by a QR code scanner, e.g., a camera of a smartphone. Smaller squares of the QR code are used to help correct distortion. A QR code also includes version information corresponding to the QR code's data capacity, and data and error correction keys forming encoded information and associated error correction codes.

To scan a QR code using a smartphone or other dedicated QR code reader, a camera of the reader views an image of the displayed QR code. Image processing software of the reader then locates the QR code in the camera's field of vision and orients the QR code before extracting the above-noted binary data from the displayed pattern of squares. If necessary, error correction is applied before an onboard processor of the reader decodes the information. Depending on the nature of the encoded data, the reader may respond to the decoded information by opening a website, displaying text, adding contact information, or performing a myriad of other possible actions.

SUMMARY

Disclosed herein are systems and methods for enabling a camera of a moving vehicle to read a two-dimentional (2D) bar code, e.g., a quick response (QR) code, from a display screen. In a representative scenario, the display screen may be connected to or collocated with a stationary infrastructure node such as a kiosk, store, tollbooth, roadside stand, or another drive-through or drive-by building or other structure. Traditionally, a camera is adjusted to a correct QR code-facing position so that the camera is able to scan and read a displayed QR code. However, in a use scenario in which the vehicle and its mounted camera are in motion relative to the display screen, it is difficult to adjust the camera's position for this purpose. Using the present teachings, however, customized QR code generation and presentation thereof on the display screen is optimized based on the dynamically changing location of the vehicle/camera, such that the vehicle-mounted camera is able to read the QR code much sooner and more accurately than would otherwise be possible in the absence of the present teachings.

In particular, a method is disclosed herein for dynamically generating a customized QR code for scanning by a vehicle-mounted camera of a moving vehicle. The method includes detecting parameters of the camera via a sensor suite of an infrastructure node as the moving vehicle approaches the infrastructure node. The parameters include at least a distance and approach angle of the vehicle relative to the infrastructure node. The method also includes dynamically reshaping a baseline QR code, e.g., a typical square, forward-facing QR code, in response to the parameters. This action, which occurs via operation of a processor of the infrastructure node, generates the customized QR code, i.e., one having a modified shape, size, and data capacity relative to the baseline QR code. Additionally, the method includes transmitting a display control signal to a display screen of the infrastructure node to cause the display screen to present the customized QR code thereon as the moving vehicle approaches the infrastructure node.

An aspect of the disclosure includes a method for dynamically generating a customized QR code for scanning by a moving vehicle during a vehicle-merchant transaction. The method may include detecting parameters of the vehicle-mounted camera via a sensor suite of an infrastructure node, with the node being in communication with a merchant back office. This occurs as the moving vehicle approaches the infrastructure node. The parameters include a distance and an approach angle of the vehicle-mounted camera relative to the infrastructure node. The method includes dynamically reshaping a baseline QR code in response to the parameters, via a processor of the infrastructure node, to thereby generate a customized QR code having a modified shape, size, and/or data capacity relative to the baseline QR code. Additionally, the method may include transmitting a display control signal to a display screen of the infrastructure node and displaying the customized QR code on the display screen in response to the display control signal as the moving vehicle approaches the infrastructure node to enable the vehicle-mounted camera to scan the customized QR code during the vehicle-merchant transaction.

Displaying the customized QR code on the display screen may include generating a pixelated image that is skewed in a two-dimensional (2D) reference frame of the display screen. Detecting the parameters may include using one or more infrastructure cameras mounted to or collocated with the infrastructure node, and wherein the sensor suite includes the one or more infrastructure cameras, possibly using lidar sensor or a radar sensor of the infrastructure node.

Detecting the parameters in one or more embodiments includes using an ultra-wide band (UWB) sensor of the infrastructure node.

Dynamically reshaping the baseline square QR code may include performing a three-dimensional (3D) to 2D projection via the processor of the infrastructure node to cause a 2D plane of the customized QR code when displayed via the display screen to be perpendicular to a focal axis of the vehicle-mounted camera.

The method may include establishing a secure network connection between the infrastructure node and the merchant back office, and then completing the vehicle-merchant transaction in response to a successful scanning of the customized QR code by the vehicle-mounted camera. Embodiments of the method also include establishing another secure network connection between the merchant back office and a cloud-based payment service. In this instance, completing the vehicle-merchant transaction includes submitting payment information to the cloud-based payment service via the merchant back office.

Dynamically reshaping the baseline QR code may include calculating a required data capacity and resolution of the customized QR code based on a relative position of the moving vehicle and the infrastructure node.

The method in one or more implementations may include collecting historical drive-through data for a plurality of past encountered vehicles and the infrastructure node, including recording a time and a position of each of the past encountered vehicles, and training a support vector module (SVM) to identify successfully decoded scans and unsuccessfully decoded scans using the historical drive-through data. The method may also include using the trained SVM to generate a predicted ideal size and a predicted ideal data capacity of the customized QR code during the vehicle-merchant transaction, along with dynamically reshaping the baseline QR code at least in part using the predicted ideal size and a predicted ideal data capacity.

An infrastructure node is also disclosed herein that is operable for performing a vehicle-merchant transaction with a moving vehicle. The infrastructure node may include a stationary structure, a sensor suite mounted to or collocated with the stationary structure, a display screen, and a server in communication with a merchant back office. The server may include a processor and a non-transitory computer readable storage medium ("memory") on which is recorded instructions. Execution of the instructions by the processor causes the server to dynamically generate a customized QR code for scanning by the moving vehicle having a vehicle-mounted camera and detect parameters of the vehicle-mounted camera via the sensor suite as the moving vehicle approaches the stationary structure. The parameters include a distance and approach angle of the vehicle-mounted camera relative to the stationary structure.

Execution of the instructions in this embodiment also causes the processor to dynamically reshape a baseline QR code in response to the parameters, via the processor, to thereby generate a customized QR code having a modified shape, size, and/or data capacity relative to the baseline QR code. The processor then transmits a display control signal to the display screen to cause the display screen to display the customized QR code as the moving vehicle approaches the stationary structure, thereby enabling the vehicle-mounted camera to scan the customized QR code during the vehicle-merchant transaction.

Another embodiment of the above-summarized method for dynamically generating a customized QR code includes detecting parameters of a vehicle-mounted camera of the vehicle, via a sensor suite of an infrastructure node in communication with a merchant back office as the moving vehicle approaches the infrastructure node, the sensor suite including an infrastructure camera and one or more of a radar sensor, a lidar sensor, or a UWB sensor mounted to the infrastructure node. The parameters including a distance and approach angle of the vehicle-mounted camera relative to the infrastructure node. The method includes dynamically reshaping a baseline QR code in response to the parameters, via a processor of the infrastructure node, to thereby generate a customized QR code having a modified shape, size, and/or data capacity relative to the baseline QR code. This action in turn includes performing a 3D-to-2D projection via the processor of the infrastructure node to cause a 2D plane of the customized QR code when displayed via the display screen to be perpendicular to a focal axis of the vehicle-mounted camera.

The method also includes calculating a required data capacity and resolution of the customized QR code based on the relative position of the moving vehicle and the infrastructure node, transmitting a display control signal to a display screen of the infrastructure node, and displaying the customized QR code on the display screen in response to the display control signal as the moving vehicle approaches the infrastructure node to enable the vehicle-mounted camera to scan the customized QR code during the vehicle-merchant transaction.

The above and other features and advantages of this disclosure will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

Figure 1:
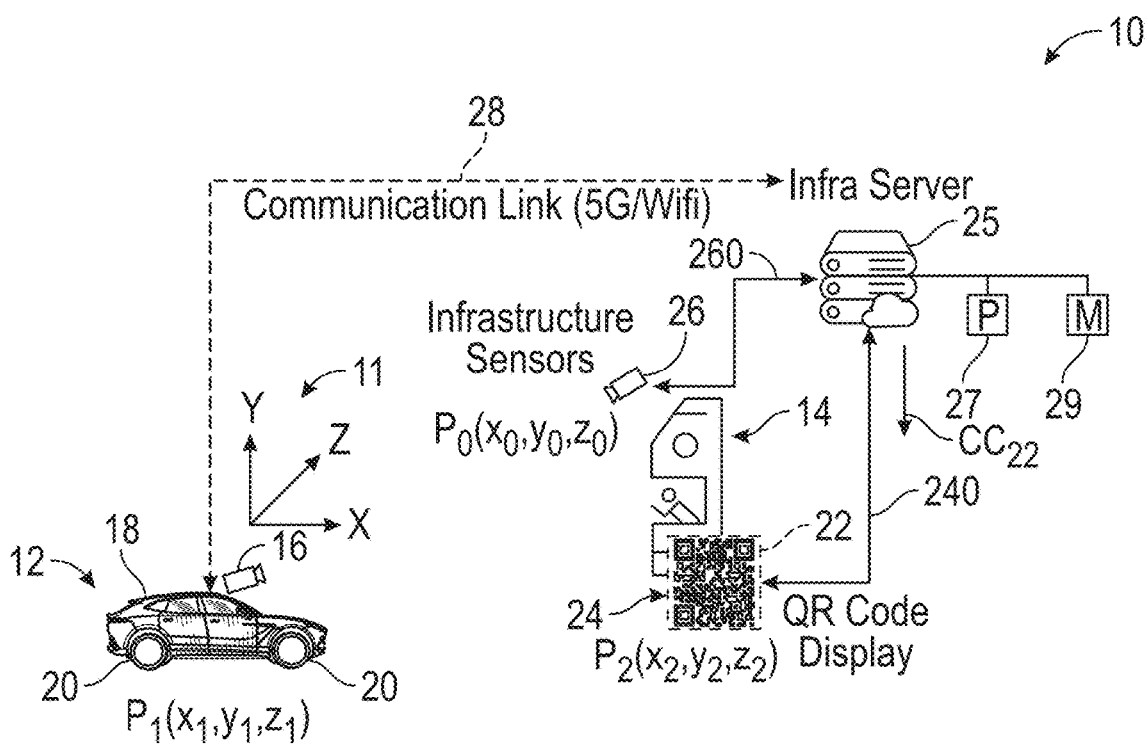
FIG. 1 is an illustration of an exemplary operating scenario in which a moving vehicle reads a displayed customized 2D bar code from an infrastructure node, with characteristics of the customized 2D bar code calculated and applied by a server of the infrastructure node.

The present disclosure may be modified or embodied in alternative forms, with representative embodiments shown in the drawings and described in detail below. Inventive aspects of the present disclosure are not limited to the disclosed embodiments. Rather, the present disclosure is intended to cover alternatives falling within the scope of the disclosure as defined by the appended claims.

DETAILED DESCRIPTION

Referring to the drawings, wherein like reference numbers refer to like features throughout the several views, FIG. 1 illustrates a networked architecture 10 in which a vehicle 12 is in motion relative to infrastructure node 14, e.g., a roadside kiosk, tollbooth, store, or another drive-through/drive-by structure acting as a point of sale for a vehicle-merchant transaction. The vehicle 12 includes a vehicle-mounted camera 16, i.e., one or more cameras mounted to a rearview mirror, dashboard, or other forward-facing location of a vehicle body 18 of the vehicle 12. The camera 16 has a three-dimensional (3D) coordinate system or camera frame of reference 11, the axes of which are nominally labeled X, Y, and Z. The vehicle 12 may also include a set of road wheels 20 coupled to the vehicle body 18, with an internal combustion engine, electric traction motor, or another prime mover (not shown) providing torque to one or more of the road wheels 20 to propel the vehicle 12 toward the infrastructure node 14. While the vehicle 12 is shown as a typical passenger vehicle, other mobile platforms may be used within the scope of the disclosure, e.g., trucks, boats, motorcycles, bicycles, farm equipment, etc., without limitation.

In a possible use scenario, an operator of the vehicle 12 may wish to transact with a potentially distant provider or merchant via the infrastructure node 14, for instance by purchasing goods or services, or possibly obtaining access to a roadway, bridge, or other access-restricted location. To that end, the camera 16 may be automatically focused on a display screen 22 that is connected to or collocated with the infrastructure node 14, and on which is displayed a customized two-dimentional (2D) bar code 24, e.g., an example quick response (QR) code® 24. For simplicity, the 2D bar code 24 is referred to interchangeably as the QR code 24. To complete the aforementioned vehicle-merchant transaction, the camera 16 is operable for discovering the customized QR code 24 in the field of vision of the camera 16, zooming in on the customized QR code 24, and thereafter scanning/ reading multiple frames of the customized QR code 24. However, motion of the vehicle 12 relative to the infrastructure node 14 may reduce scanning speed and accuracy. The present teachings are therefore directed toward improving upon these and other aspects of a QR code-based vehicle-merchant transaction.

In particular, when the vehicle 12 is in motion relative to the infrastructure node 14 and the camera 16 attempts to read a displayed QR code located in front of and at an angle with respect to the vehicle 12, several factors are accounted for herein to optimize the QR code scanning task. For instance, the position of the camera 16 on the vehicle 12 is normally fixed, or the position is at least difficult to adjust in real time. A distance between the camera 16 and the infrastructure node 14 may be too great and/or at too pronounced of an approach angle for quick and accurate scanning. The resolution of the camera 16 may be too low. While QR codes have embedded special patterns to help reduce distortion and alignment to the patterns, problems may arise when attempting to view and scan a QR code from an angle. For instance, the pixel resolution is significantly reduced at greater distances/angles, which in turn causes QR code reading failures.

To address these and other potential problems in the scenario of FIG. 1, an infrastructure server 25 of the infrastructure node 14 is configured to detect a position of the camera 16 and optimize generation and display of the customized QR code 24 to account for the detected position. Doing so helps the camera 16 accurately discover and read the customized QR code 24 sooner than would otherwise be possible in the absence of the present teachings. The present solutions therefore provide an enhanced customer experience, for instance in onboard mobile payment use cases, examples of which are described below with reference to FIGS. 7 and 8.

To implement the present solutions, the infrastructure node 14 of FIG. 1 is equipped with a sensor suite 26 operable for detecting relative positions between the vehicle 12 and the display screen 22 on which the customized QR code 24 is ultimately displayed. Resident sensors of the sensor suite 26 may include, by way of example and not of limitation, infrastructure cameras, lidar sensors, radar sensors, ultrawide band (UWB) sensors, etc. The server 25 ultimately leverages the detected relative positions to generate the customized QR code 24 in a customized shape, e.g., size, angle, and/or data content, and display the customized QR code 24 in its customized shape via the display screen 22.

To that end, the vehicle 12 may communicate with the server 25 via a secure network connection 28, e.g., a communication link or channel such as a 5G cellular or WiFi link. Similarly, a network connection 240 may be established between the server 25 and the sensor suite 26, while another secure network connection 260 may be established between the infra server 25 and the display screen 22. As the sensor suite 26 and the display screen 22 may be collocated with the infrastructure node 14, the network connections 240 and 260 may be hardwired in some embodiments, for instance via an ethernet connection, or the network connections 240 and 260 may be implemented wirelessly. Wireless communication may be performed according to a suitable wireless protocols, such as the IEEE 802.11 protocols, Worldwide Interoperability for Microwave Access (WiMAX), and/or BLUETOOTH™.

The server 25 is depicted schematically in FIG. 1 as having one or more processors (P) 27 and memory (M) 29, the latter being inclusive of non-transitory memory or tangible non-transitory computer storage media/devices (read only, programmable read only, solid-state, random access, optical, magnetic, etc.). The memory 29, on which computer-readable instructions embodying the method 100 of FIG. 3 may be recorded, is capable of storing machine-readable instructions in the form of one or more software or firmware programs or routines, combinational logic circuit(s), input/output circuit(s) and devices, signal conditioning and buffer circuitry and other components that can be accessed by one or more processors to provide a described functionality.

Additionally with respect to the server 25, input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Ultimately, the server 25 outputs a display control signal (arrow $CC_{22}$) to the display screen 22 to cause the display screen 22 to display the reshaped customized QR code 24 as set forth herein.

Figure 2:
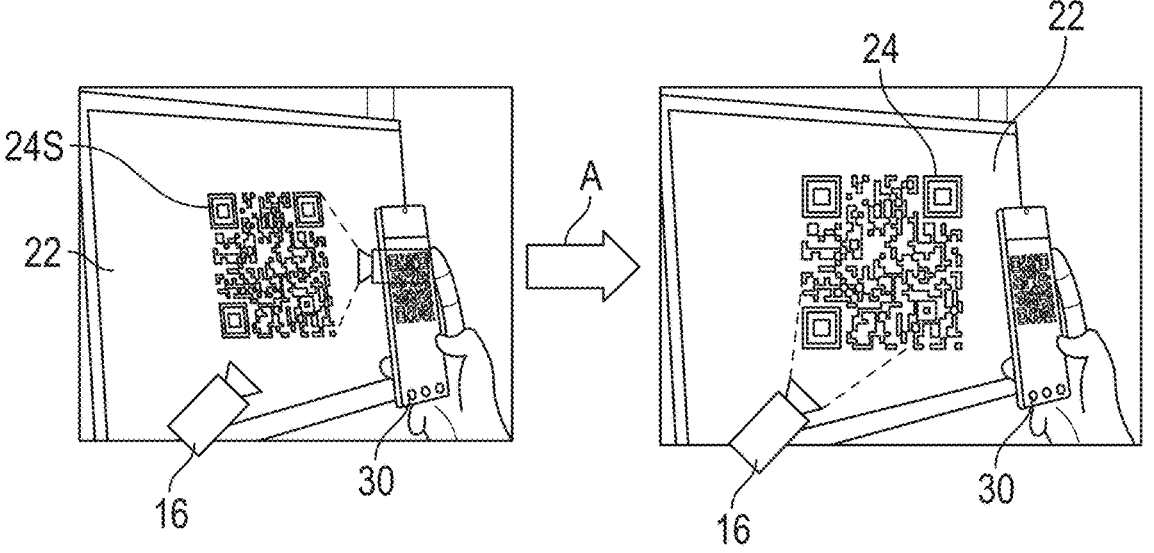
FIG. 2 illustrates example QR code customization and display in accordance with an aspect of the disclosure.

Referring briefly to FIG. 2, a baseline QR code 24S is shown as it might appear when presented via the display screen 22 in its normal forward-facing, square shape configuration. When such a baseline QR code 24S is scanned by a smartphone 30 or other suitable code scanner, the camera (not shown) of the smartphone 30 is proximate to and facing the baseline QR code 24S, typically with a plane of the smartphone 30 oriented parallel to a plane of the display screen 22. The position of the smartphone 30 therefore must be adjusted for the camera of thew smartphone 30 to successfully detect and decode the QR code 24S. However, the scenario of FIG. 1 would see the camera 16 (also shown for reference in FIG. 2) located a substantial distance away from (and at an approach angle with respect to) the baseline QR code 24S. The normal square appearance of the baseline QR code 24S therefore will not be read in an accurate and timely manner by the camera 16 when approaching the infrastructure node 14.

As indicated by arrow A, however, operation of the server 25 as set forth herein will result in a dynamic reshaping of the baseline QR code 24S based on a detected relative position of the camera 16. Using the present teachings, and regardless of the approach angle of the camera 16 relative to the infrastructure node 14 as the vehicle 12 approaches, the customized QR code 24 will appear (from the viewing perspective of the camera 16) as having the same square shape in spite of its skewed, resized, and/or other modified characteristic as it actually appears on the display screen 22.

Figure 3:
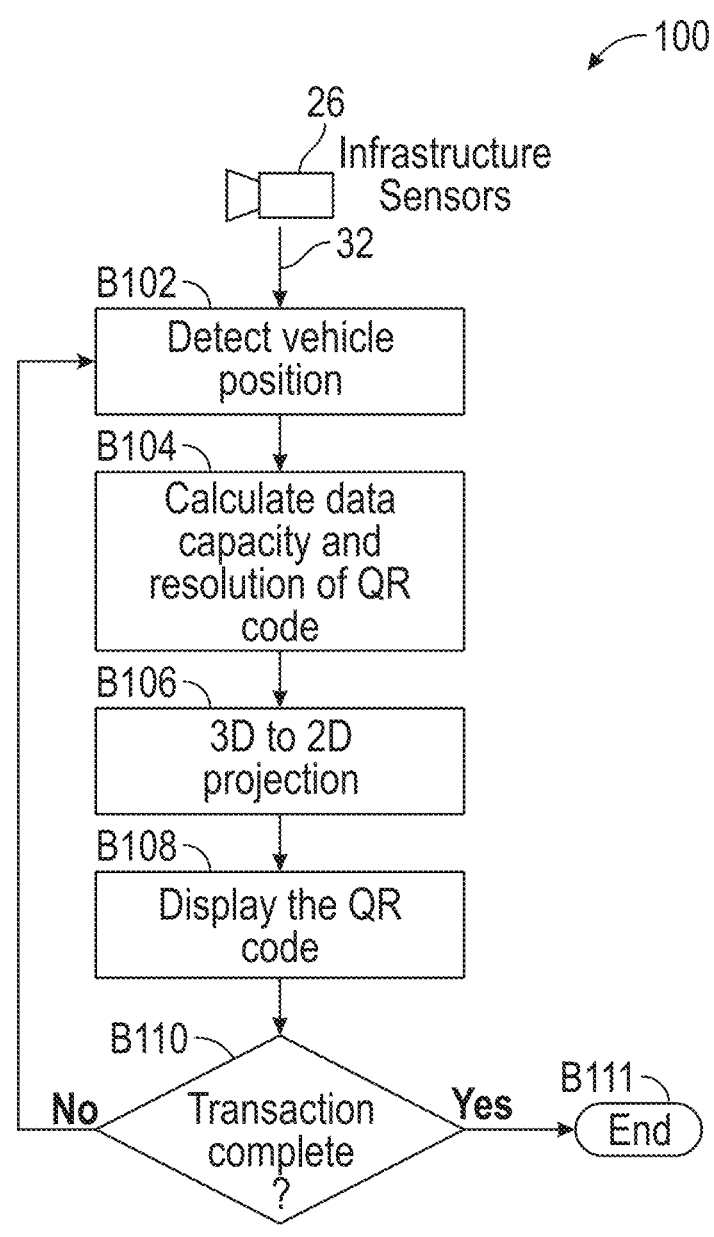
FIG. 3 is a flow chart describing a method for enabling a vehicle-mounted camera of a moving vehicle to scan/read a QR code from a display screen of an infrastructure node.

Referring to FIG. 3, a method 100 may be embodied as computer readable instructions and recorded in memory 29 of the server 25 of FIG. 1. For illustrative clarity, the method 100 is described in terms of code segments or logic blocks each executable by the processor 27 of FIG. 1 to cause the server 25 to perform the described functions. In general, the method 100 is configured for dynamically generating the customized QR code 24 for scanning by the moving vehicle 12 having at least one vehicle-mounted camera 16.

Commencing at block B 102, the method 100 includes detecting parameters of the vehicle-mounted camera 16, via the sensor suite 26 of the infrastructure node 14, as the moving vehicle 12 approaches the infrastructure node 14. As noted below with reference to FIGS. 7 and 8, the infrastructure node 14 is in communication with a merchant back office (BO) 42. The parameters include a distance and approach angle ("relative position data 32") of the camera 16 relative to the infrastructure node 14.

As part of block B102, the server 25 of FIG. 1 receives the relative position data 32 from the sensor suite 26 via the network connection 260, with the relative position data 32 being descriptive of a relative position of the vehicle 12/camera 16 and the infrastructure node 14, in particular the display screen 22. Using the relative position data 32, the server 25 detects the position of the vehicle 12 and its connected camera 16. As appreciated in the art, and using nominal x, y, z position coordinates, the sensor suite 26 has a position $p_0$ $(x_0, y_0, z_0)$, the vehicle 12 has a position $p_1(x_1, y_1, z_1)$, and the display screen 22 has a position $p_2$ $(x_2, y_2, z_2)$. Thus, block B102 entails determining the 3D coordinates for the vehicle 12, the sensor suite 26, and the display screen 22 as $p_0$, $p_1$, and $p_2$, respectively. The method 100 thereafter proceeds to block B104.

Block B104 entails calculating the data capacity and resolution of the customized QR code 24 using the relative position of the vehicle 12/camera 16. The method 100 proceeds to block B106 after calculating the data capacity and resolution.

At block B106, the method 100 includes dynamically reshaping the baseline QR code 24S in response to the parameters, via the processor 27 of the infrastructure node 14, to thereby generate the customized QR code 24. The customized QR code 24 has a modified shape, size, and/or data capacity relative to the baseline QR code 24S as described above.

In one or more embodiments, block B106 may include performing a 3D to two-dimensional (2D) projection during which the processor 27 of the server 25 shown in FIG. 1 projects the customized QR code 24 from a 3D space to 2D space. In the 3D space, i.e., the 3D position of the camera 16 in free space, or in other words the frame of reference 11 of FIG. 1, the server 25 creates a QR code display plane and ensures the display plane is perpendicular to the focal axis of the camera 16. The QR code in this virtual 3D space is then projected onto a 2D plane for display via the display screen 22 of FIG. 1, i.e., onto the 2D space.

Figure 4:
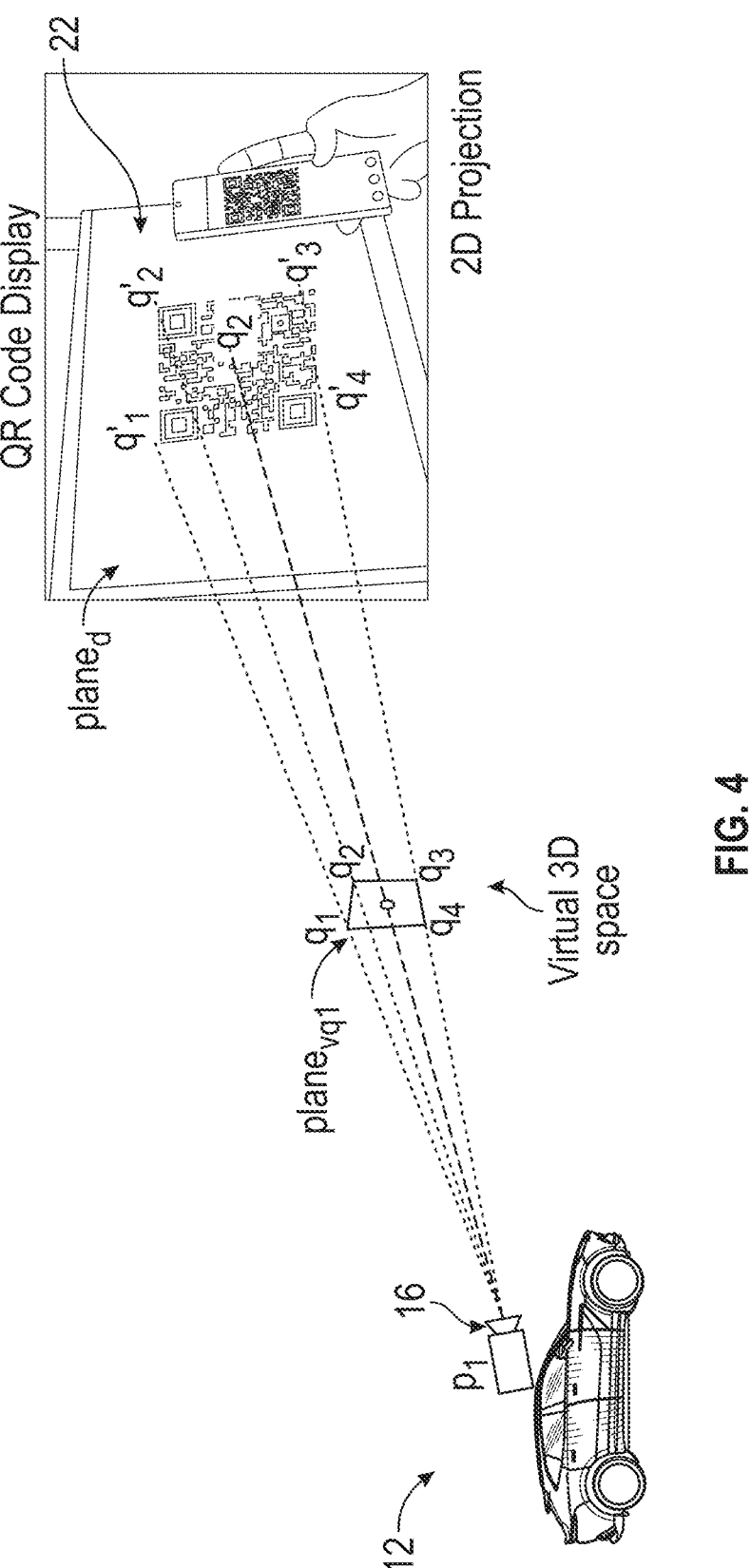
FIG. 4 is an illustration of reprojection of a customized QR code in accordance with an aspect of the disclosure.

Referring briefly to FIG. 4, block B106 entails creating a virtual QR code in the 3D space, with the virtual QR code then plotted on a $plane_v$ in the 3D space. The $plane_v$ is perpendicular to the line $(p_1, p_2)$. The rectangle formed by the virtual QR code has four corner points $(q_1, q_2, q_3, q_4)$. For 3D to 2D projection to the 2D $plane_d$, with its corner points $(q'_1, q'_2, q'_3, q'_4)$, $plane_d$ may be expressed in vector notation as:

$$(p-p_0)\cdot n=0$$

where n is a normal vector to the $plane_y$ and $p_0$ is a point on the $plane_v$. The line $(p_1, q_1)$ may also be expressed in vector notation, this time as:

$$p=l_0+ld \quad d\in \mathbb{R}$$

where l is a unit vector in the direction of the line, $l_0$ is a point on the line, and d is a scalar in the real number domain. The intersection point, $q_1$, may be calculated as follows:

8

$$d = \frac{(p_0 - l_0)\cdot n}{l\cdot n}$$

$$q_1 = l_0 + l_d$$

$q_2$, $q_3$, $q_4$ can be calculated in a comparable way. The method 100 then proceeds to block B108.

At block B108 of FIG. 3, the server 25 may transmit the display control signal $(CC_{22})$ of FIG. 1 to the display screen 22 to cause the display screen 22 to display the reshaped customized QR code 24. Unlike the standard QR code 24S of FIG. 2, the reshaped/reprojected nature of the customized QR code 24 will appear to the camera 16 as a square rather than as an arbitrary quadrilateral, even though the same customized QR code 24 appearing as the latter to a viewer standing directly in front of the display screen 22. This appearance enables the vehicle-mounted camera 16 to scan the customized QR code 24 during the vehicle-merchant transaction. The method 100 proceeds to block B110 after the server 25 displays the customized QR code 24.

Block B110 includes determining if the QR code scanning/vehicle-merchant transaction initiated at block B102 is complete. If so, the method 100 proceeds to block B111. The method 100 proceeds in the alternative to block B102.

Figure 7:
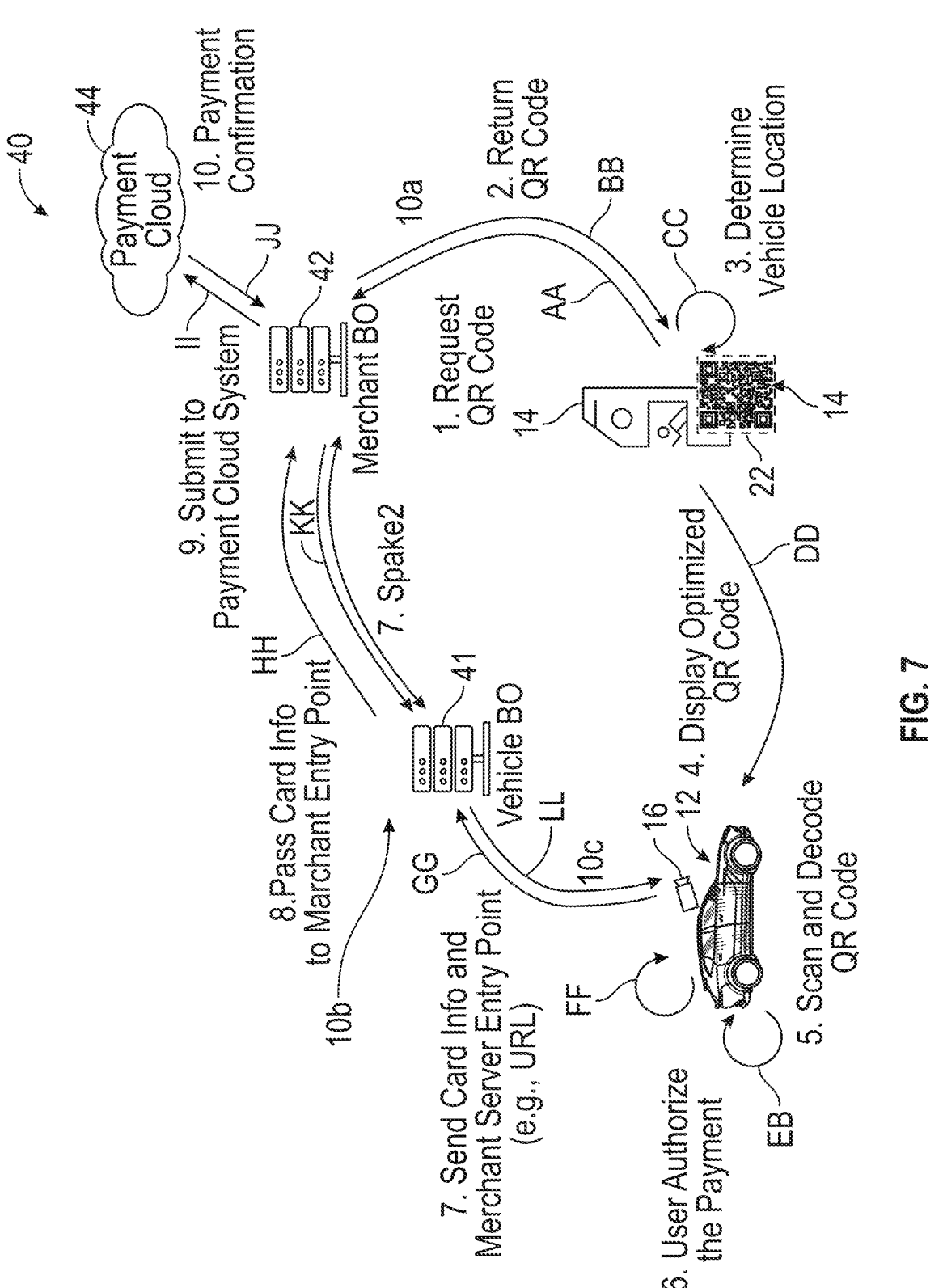
FIGS. 7 and 8 are illustrations of possible cloud-based payment processes that may be implemented in accordance with aspects of the disclosure.
Figure 8:
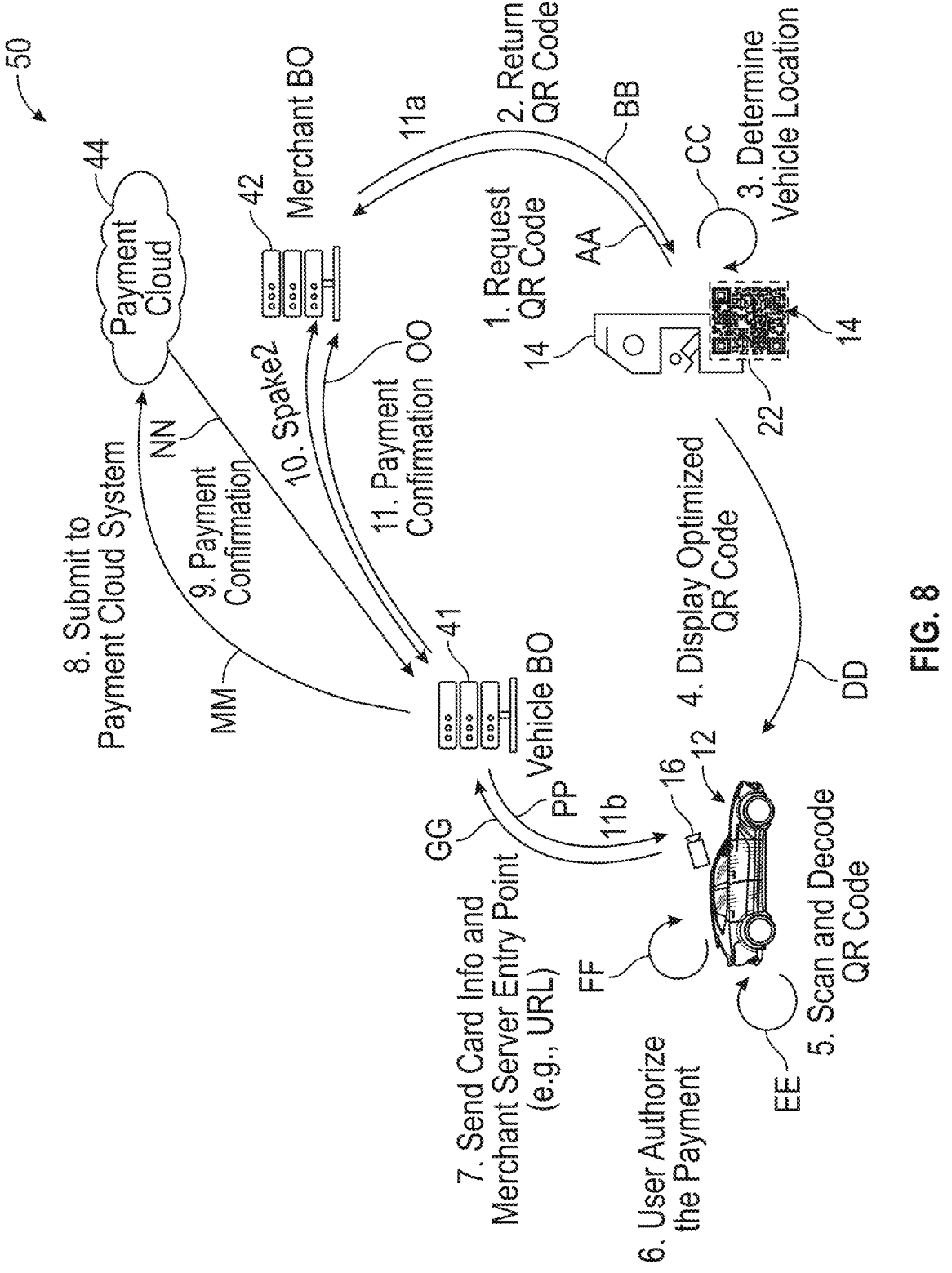

Block B111 may include executing a payment processing sequence, e.g., as shown in FIGS. 7 and 8 and discussed below. For example, if the QR code scanning process of blocks B102-B110 involves a financial transaction such as payment of a bridge or road toll, purchase of good or services, etc., then block B111 may be performed to exchange currency between the owner of the vehicle 12 and the owner of the infrastructure node 14 of FIG. 1. The method 100 is complete after payment has been successfully processed.

Figure 5:
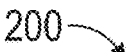
FIG. 5 is a flow chart describing a possible crowd sourcing method usable as part of the present strategy.
Figure 5:
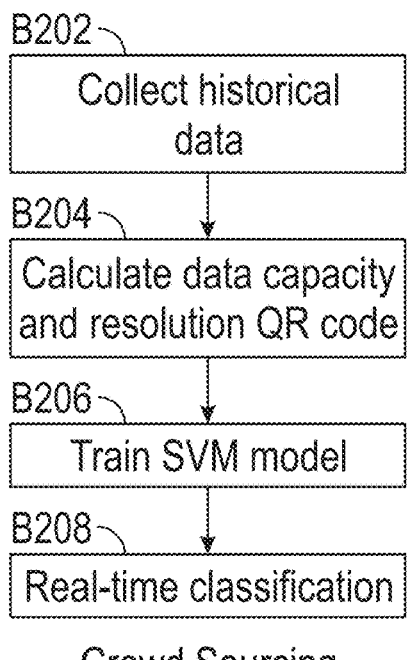

Referring to FIG. 5, the above teachings may be expanded upon using optional crowd sourcing, which may be used to facilitate identification by the infrastructure node 14 of FIG. 1 of an ideal size of the customized QR code 24 and data capacity for the vehicle 12 at a given distance. As a possible approach, the infrastructure node 14 may leverage crowd-sourced "drive-through" data to create a supervised learning model. The model may help the infrastructure node 14 to more accurately predict the ideal QR code size and data capacity when a new/previously not encountered vehicle 12 visits the same location as a plurality of prior/previously encountered vehicles 12.

As a possible approach, a method 200 for leveraging such crowd sourcing advantages commences with block B202 with the collection of historical drive-through data. For example, the server 25 of FIG. 1 may record time and position of each encountered vehicle 12 each time the sensor suite 26 (i) detects a vehicle 12, (ii) initiates a vehicle-merchant transaction on the cloud, and (iii) completes the vehicle-merchant transaction on the cloud. The method 200 then proceeds to block B204.

Block B204 may entail calculating data capacity and resolution of the customized QR code 24. This action includes representing the data in a high-dimensional space, with the dimensions in such a space possibly including vehicle positions, QR code display size, QR code data capacity, decoding success, and/or other dimensions. The method 200 proceeds to block B206 after calculating the data capacity and resolution of the customized QR code 24.

At block B206, the server 25 may train a support vector module (SVM) to identify a hyperplane that maximally separates data samples into two distinct sets: (i) successful decoding/decoded, and (ii) unsuccessful decoding/not decoded. As appreciated in the art, an SVM is an exemplary supervised learning strategy for classification of samples. One the hyperplane of the SVM is determined, new data points may be classified by determining the side of the hyperplane on which the point falls. The method 100 proceeds to block B208 once the SVM has been trained.

Figure 6:
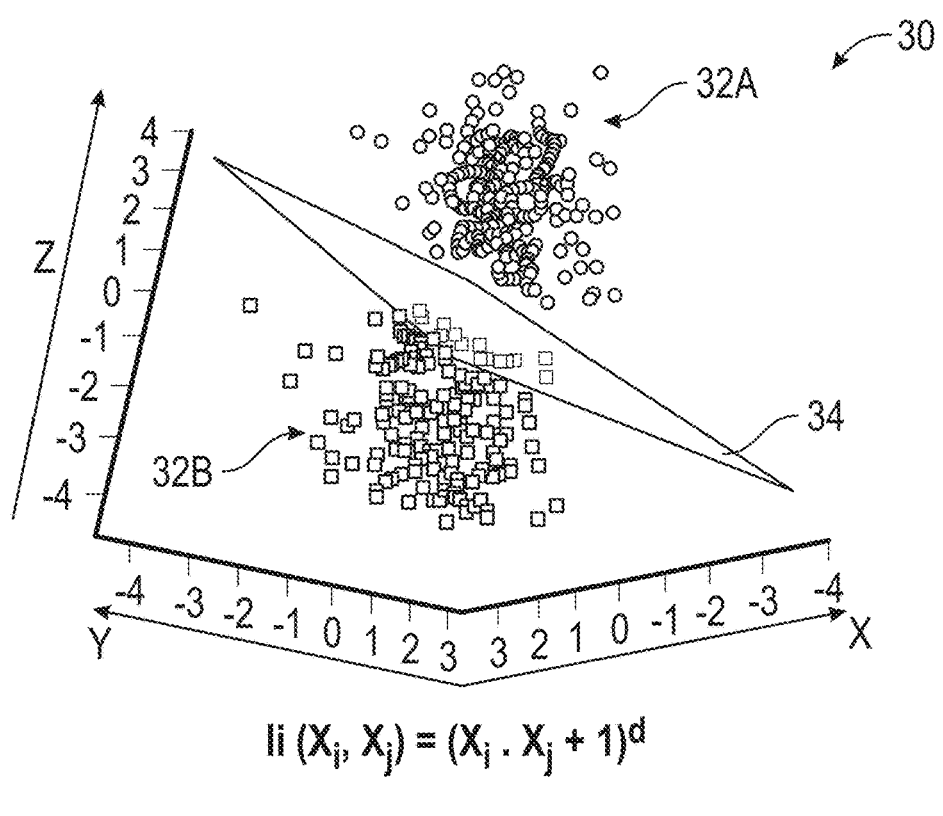
FIG. 6 is an illustration of a Support Vector Machine (SVM) usable as an optional part of the present strategy.

Referring briefly to FIG. 6, a high-dimensional space is shown in an SVM 30. Data points 32A, 32B are located on either side of the above-noted hyperplane 34. In this example, the data points 32A correspond to the set "unsuccessful decoding/not decoded". The data points 32B correspond to the set "successful decoding/decoded". In the SVM 30, x represents the position of the vehicle 12, y is the QR code size, and z is the data capacity. Additionally, a polynomial kernel (k) may be used in the SVM, i.e.:

$$k(x_i, x_j) = (x_i \cdot x_j + 1)^d$$

where $x_i$, $x_j$ are two data sets, each point may have three dimensions (vehicle position, QR code size, data capacity), and d is the degree of polynomial.

Referring once again to FIG. 4, block B208 includes performing real-time classification of new data samples using the trained SVM from block B206. As the vehicle 12 comes into the same drive-through location, the SVM model may be used by the server 25 to predict the ideal size of the customized QR code 24 and its data capacity. Together, the predicted values help the server 25 to accurately scan and quickly decode the customized QR code 24 as the vehicle 12 approaches the infrastructure location 14.

For each drive-through event using the method 200, the infrastructure node 14 may include recorded sensor data, QR code states, and system states in memory 29 (FIG. 1) for later crowd-sourcing processing. Representative sensor data may include the present position of the vehicle 12 (distance and angles relative to the infrastructure, etc.) and speed/acceleration of the vehicle 12. The QR code states may include QR code display size and data capacity as noted above. System states may include a binary classification, e.g., "decoded" and "not decoded" as discussed above in block B206.

Referring to FIGS. 7 and 8, respective cloud-based payment processes 40 and 50 illustrate two possible implementations for monetizing the basic vehicle-to-infrastructure transaction of FIG. 1. In the merchant back office (BO) path of FIG. 7, an assumption is made that the vehicle 12 and a merchant BO 42 are mutually certified and that a secure element of the vehicle 12 stores payment account or credit card information. Additionally, submission is made to a payment cloud, e.g., a payment processor or payment gateway such as PayPal, etc., and a security protocol such as SPAKE2 is used.

In an exemplary sequence commencing with step (1), the infrastructure node 14 may request a QR code from the merchant BO 42 for a given good, service, or other deliverable, as indicated by communications link AA, with the merchant BO 42 returning the QR code to the infrastructure node 14 over a communications link BB at step (2). At step (3), the infrastructure node 14 determines the location of the vehicle 12 using the sensor suite 26 (FIG. 1) as set forth above, via a communications loop CC, then displaying the optimized/reshaped customized QR code 24 via the display screen 22 via communication link DD at step (4), with link DD being analogous to link 240 of FIG. 1.

The vehicle 12, using its camera 16, then scans and decodes the customized QR code 24 at step (5), via a communications loop EE. Step (6) may entail authorization of payment by the user, perhaps via an in-vehicle touch screen confirmation or confirmation code, communications loop FF. The user's card information and merchant's server entry point (e.g., a URL) is sent at step (7) via communications link GG to a vehicle BO 41, e.g., using the SPAKE2 or other suitable security protocol.

Continuing with the discussion of FIG. 7, the vehicle BO 41 may send the card information to an entry point of the merchant BO 42 via communications link HH at step (8), with the merchant BO 42 submitting the information to a cloud-based payment service 44 via communications link II at step (9). The service 44 may then confirm successful payment at steps (10a) and (10b), e.g., by transmitting a payment receipt to the infrastructure node 14 via communications link JJ at step (10a) and the vehicle BO 41 via communications link KK at step (10b). The vehicle BO 41 may then confirm the transaction with the user at step (10c) over a communications link LL by transmitting the payment receipt to the vehicle 12. As with communications links 28, 240, and 260 of FIG. 1, the various links/loops AA-LL may be wireless communication pathways established and coordinated according to a suitable wireless protocols, such as an IEEE 802.11 protocol, Worldwide Interoperability for Microwave Access (WiMAX), BLUETOOTH™, BLUETOOTH LOW ENERGY (BLE), etc.

Referring to the cloud-based payment process 50 of FIG. 8, which uses a vehicle back office (BO) path, the above-noted assumptions are made, i.e., the vehicle 12 and a merchant BO 42 are mutually certified, a secure element of the vehicle 12 stores payment account or credit card information, submission is made to the cloud-based payment service 44, and a suitable security protocol is used. Likewise, payment process 50 uses steps (1)-(7) and links/loops AA-GG in common with payment process 40 of FIG. 7, with steps (1)-(7) described above.

At step (8) of payment process 50, and unlike the sequence of process 40, the vehicle BO 41 may send the card information directly to the payment cloud system 44 over a communications link MM. The cloud-based payment service 44 may confirm successful payment over a communications link NN at step (9) by transmitting a payment receipt to the vehicle BO 41. The vehicle BO 41 may then initiate communication with the merchant BO 41 via a security protocol (e.g., SPAKE2) at step (10) and confirm the transaction with the merchant BO 41 at step (11) via the secure link, e.g., a communications link OO. The merchant BO 41 may transmit a similar confirmation to the infrastructure node 14 via a communications link PP at step (11a).

Among other potential benefits, the present approach enables a more rapid and accurate approach for generating QR codes for use in vehicle-to-merchant transactions in which the vehicle 12 is moving relative to the infrastructure node 14, such as the exemplary use scenarios depicted in FIGS. 1, 7, and 8. The solutions described herein may be used to optimize QR code generation and display based on the dynamically changing location of the camera 16 of the vehicle 12 so that the camera 16 is able to accurately read the customized QR code 24 from afar. This is made possible by projection of the QR code into the 2D plane of the display screen 22 of FIG. 1 in a manner that accounts for relative position of the vehicle 12 and the infrastructure node 14. In spite of embedding special patterns in a QR code to help a scanner undistort and align, scanning failures may result from the significantly reduced pixel resolution when attempting to view a QR code from an approach angle as in FIG. 1. Therefore, the present teachings may be employed to enhance the overall customer experience during in-vehicle onboard mobile payment situations such as drive-through services or merchants, toll booths, electric vehicle (EV) charging stations, and the like. These and other potential benefits will be readily recognized by those skilled in the art now having the benefit of the foregoing disclosure.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method for dynamically generating a customized two-dimensional (2D) bar code for scanning by a moving vehicle during a vehicle-merchant transaction, the method comprising:

detecting parameters of the vehicle-mounted camera, via a sensor suite of an infrastructure node in communication with a merchant back office, as the moving vehicle approaches the infrastructure node, the parameters including a distance and approach angle of the vehicle-mounted camera relative to the infrastructure node;

dynamically reshaping a baseline 2D bar code in response to the parameters, via a processor of the infrastructure node, to thereby generate a customized 2D bar code having a modified shape, size, and/or data capacity relative to the baseline 2D bar code;

transmitting a display control signal to a display screen of the infrastructure node; and displaying the customized 2D bar code on the display screen in response to the display control signal as the moving vehicle approaches the infrastructure node to enable the vehicle-mounted camera to scan the customized 2D bar code during the vehicle-merchant transaction.

2. The method of claim 1, wherein displaying the customized 2D bar code on the display screen includes generating a pixelated image that is skewed in a two-dimensional (2D) reference frame of the display screen.

3. The method of claim 2, wherein detecting the parameters includes using one or more infrastructure cameras mounted to or collocated with the infrastructure node, and wherein the sensor suite includes the one or more infrastructure cameras.

4. The method of claim 2, wherein detecting the parameters includes using lidar sensor or a radar sensor of the infrastructure node, and wherein the sensor suite includes the radar sensor or the lidar sensor.

5. The method of claim 1, wherein detecting the parameters includes using an ultra-wide band (UWB) sensor of the infrastructure node, and wherein the sensor suite includes the UWB sensor.

6. The method of claim 1, wherein dynamically reshaping the baseline square 2D bar code includes performing a three-dimensional (3D) to two-dimensional (2D) projection via the processor of the infrastructure node to cause a 2D plane of the customized 2D bar code when displayed via the display screen to be perpendicular to a focal axis of the vehicle-mounted camera.

7. The method of claim 1, further comprising:

establishing a secure network connection between the infrastructure node and the merchant back office; and completing the vehicle-merchant transaction in response to a successful scanning of the customized 2D bar code by the vehicle-mounted camera.

8. The method of claim 7, further comprising:

establishing another secure network connection between the merchant back office and a cloud-based payment service, wherein completing the vehicle-merchant transaction includes submitting payment information to the cloud-based payment service via the merchant back office.

9. The method of claim 1, wherein dynamically reshaping the baseline ED bar code includes calculating a required data capacity and resolution of the customized 2D bar code based on a relative position of the moving vehicle and the infrastructure node.

10. The method of claim 1, further comprising:

collecting historical drive-through data for a plurality of past encountered vehicles and the infrastructure node, including recording a time and a position of each of the past encountered vehicles;

training a support vector module (SVM) to identify successfully decoded scans and unsuccessfully decoded scans using the historical drive-through data; and using the trained SVM to generate a predicted ideal size and a predicted ideal data capacity of the customized 2D bar code during the vehicle-merchant transaction; and dynamically reshaping the baseline 2D bar code at least in part using the predicted ideal size and a predicted ideal data capacity.

11. An infrastructure node operable for performing a vehicle-merchant transaction with a moving vehicle, comprising:

a stationary structure;

a sensor suite mounted to or collocated with the stationary structure;

a display screen; and a server in communication with a merchant back office and having a processor and a non-transitory computer readable storage medium ("memory") on which is recorded instructions, wherein an execution of the instructions by the processor causes the server to:

dynamically generate a customized 2D bar code for scanning by the moving vehicle having a vehicle-mounted camera;

detect parameters of the vehicle-mounted camera via the sensor suite as the moving vehicle approaches the stationary structure, the parameters including a distance and approach angle of the vehicle-mounted camera relative to the stationary structure;

dynamically reshape a baseline 2D bar code in response to the parameters, via the processor, to thereby generate a customized 2D bar code having a modified shape, size, and/or data capacity relative to the baseline 2D bar code;

transmit a display control signal to the display screen to cause the display screen to display the customized 2D bar code as the moving vehicle approaches the stationary structure, thereby enabling the vehicle-mounted camera to scan the customized 2D bar code during the vehicle-merchant transaction.

12. The infrastructure node of claim 11, wherein the execution of the instructions by the processor causes the server to display the customized 2D bar code on the display screen as a pixelated image that is skewed in a two-dimensional (2D) reference frame of the display screen.

13. The infrastructure node of claim 11, wherein the sensor suite includes one or more infrastructure cameras.

14. The infrastructure node of claim 11, wherein the sensor suite includes a radar sensor, a lidar sensor, and/or an ultra-wide band (UWB) sensor.

15. The infrastructure node of claim 11, wherein the execution of the instructions by the processor causes the server to dynamically reshape the baseline 2D bar code by performing a three-dimensional (3D) to two-dimensional (2D) projection to thereby cause a 2D plane of the customized 2D bar code when displayed via the display screen to be perpendicular to a focal axis of the vehicle-mounted camera.

16. The infrastructure node of claim 11, wherein the execution of the instructions by the processor causes the server to establish a secure network connection with the merchant back office as part of the vehicle-merchant transaction.

17. The infrastructure node of claim 11, wherein the execution of the instructions by the processor causes the server to dynamically reshaping the baseline 2D bar code by calculating a required data capacity and resolution of the customized 2D bar code based on a relative position of the moving vehicle and the infrastructure node.

18. The infrastructure node of claim 11, wherein the stationary structure is one of a store, a tollbooth, a roadside stand, or a drive-through or drive-by structure.

19. A method for dynamically generating a customized 2D bar code for scanning by a moving vehicle during a vehicle-merchant transaction, the method comprising:

detecting parameters of a vehicle-mounted camera of the vehicle, via a sensor suite of an infrastructure node in communication with a merchant back office as the moving vehicle approaches the infrastructure node, the sensor suite including an infrastructure camera and one or more of a radar sensor, a lidar sensor, or an ultra-wide band (UWB) sensor mounted to the infrastructure node, wherein the parameters include a distance and approach angle of the vehicle-mounted camera relative to the infrastructure node;

dynamically reshaping a baseline 2D bar code in response to the parameters, via a processor of the infrastructure node, to thereby generate a customized 2D bar code having a modified shape, size, and/or data capacity relative to the baseline 2D bar code, including:

performing a three-dimensional (3D) to two-dimensional (2D) projection via the processor of the infrastructure node to cause a 2D plane of the customized 2D bar code when displayed via the display screen to be perpendicular to a focal axis of the vehicle-mounted camera; and calculating a required data capacity and resolution of the customized 2D bar code based on the relative position of the moving vehicle and the infrastructure node;

transmitting a display control signal to a display screen of the infrastructure node; and displaying the customized 2D bar code on the display screen in response to the display control signal as the moving vehicle approaches the infrastructure node to enable the vehicle-mounted camera to scan the customized 2D bar code during the vehicle-merchant transaction.

20. The method of claim 19, further comprising:

establishing a first secure network connection between the infrastructure node and the merchant back office;

establishing a second secure network connection between the moving vehicle and a vehicle back office;

establishing a third secure network connection between the merchant back office and a cloud-based payment service; and completing the vehicle-merchant transaction in response to a successful scanning of the customized 2D bar code by the vehicle-mounted camera, the vehicle-merchant transaction including a financial transaction between a user of the moving vehicle and the merchant back office that is performed via the cloud-based payment service.

* * * * *